United States Patent [19]
Wilfong

[11] 3,683,700
[45] Aug. 15, 1972

[54] GAS ANALYZER
[72] Inventor: Andrew L. Wilfong, Route 1, Box 379, Tomball, Tex. 77375
[22] Filed: Aug. 28, 1970
[21] Appl. No.: 67,696

[52] U.S. Cl. ..............................................73/421.5 R
[51] Int. Cl. ..............................................G01n 1/24
[58] Field of Search ..............................73/421.5 R

[56] References Cited

UNITED STATES PATENTS

| 3,098,383 | 7/1963 | West | 73/421.5 |
| 3,196,689 | 7/1965 | Forrester et al. | 73/421.5 |
| 3,559,491 | 2/1971 | Thoen | 73/421.5 |

Primary Examiner—S. Clement Swisher
Attorney—Hyer, Eickenroht, Thompson & Turner

[57] ABSTRACT

A gas analyzer for sampling and analyzing a gas is disclosed as including a sampling head and a sensing head. The sampling head conducts sampled amounts of gas to the sensing head, and includes two elongated, straight coaxial tubular members. One of the members is slidably mounted with a close fit in the other and the outer member has an aperture for admission of gas. A flow restriction means is disposed coaxially to the members to restrict the flow of the gas to a predetermined amount, and one of the members is movable from a first position in the other member where flow of gas is relatively restricted by the flow restriction means, to a second position where such flow is relatively free.

22 Claims, 5 Drawing Figures

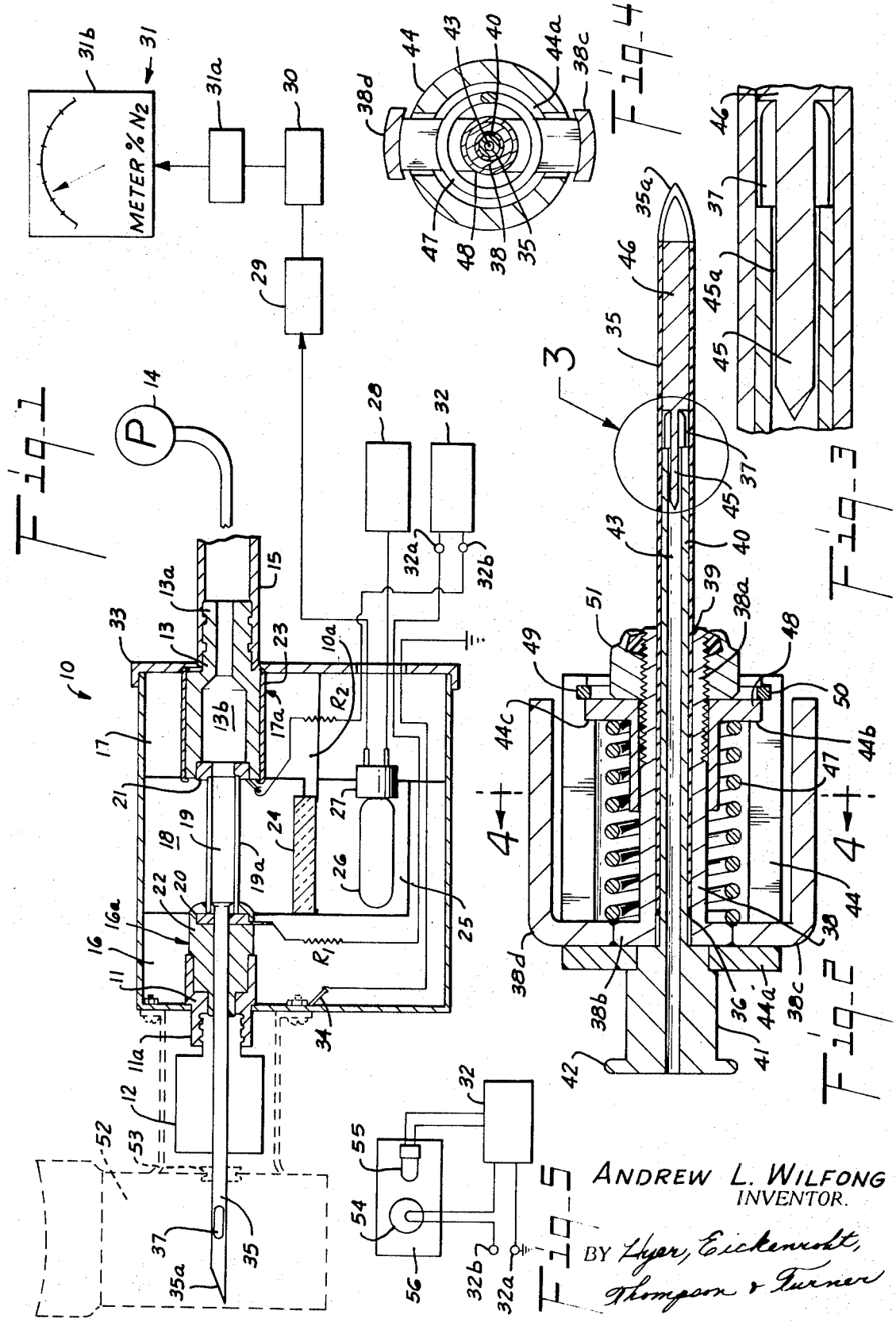

GAS ANALYZER

This invention relates to a gas analyzer for analyzing and determining the concentration of a gas, and in one of its aspects to a sampling head for obtaining sampled amounts of gas and regulating the flow of the sampled gas to the analyzer. A further aspect of this invention is the provision of such a gas analyzer and sampling head for use in determining the nitrogen concentration during human expiration.

In determining the condition of the lugs during human physiologic investigations an important test is the analysis of respiratory nitrogen washout. While several different methods have been devised for this test, highly stable and reliable equipment is necessary for each of these tests in order to obtain accurate and repeatable results. Small concentrations of nitrogen are generally involved, and a drift in the instrumentation of a very small amount can result in unacceptable results.

The typical nitrogen gas analyzer for medical applications includes a sampling head which is a flow control device for providing accurately metered samples of nitrogen gas to the analyzer, a sensing head which generally includes a vacuum ionization chamber in which the nitrogen gas is ionized, and an electrical readout system in which the intensity of the nitrogen ionization for the sampled amount of gas is read out generally as a percentage of nitrogen concentration. The geometry of the sampling head is small and because of the need for accurate and repeatable results must be substantially fixed during each series of tests.

Prior gas analyzers of this type have not been completely satisfactory for a number of reasons, most of which have to do with the design of the sampling head. Because of the small amounts of nitrogen being detected and the small geometry involved, prior sampling heads have been difficult to calibrate and adjust to provide the desired amount of flow, and when properly adjusted, have been susceptible to being misaligned or easily knocked out of adjustment. Also, since such devices are in communication with the expiration of generally ill patients, they are subject periodically to being clogged and fouled with mucus and must be cleared. In clearing these sampling heads, it has generally been necessary to dismantle or partly dismantle the device. When the sampling head is dismantled and then reassembled, it is generally necessary to recalibrate and adjust the instrument so that considerable time is lost in the clearing operation. These prior sampling heads also have the disadvantage of employing O-ring type seals which further inhibit proper adjustment when worn or not properly seated, and such seals are susceptible to misalignment.

In nitrogen gas analyzers used in respiratory tests, a fast response time between entry of the sampled gas into the sampling head and read out is necessary. In order to insure minimum response time, dead space in the path of the flow of the gas to the sensing head must be kept to a minimum. In prior gas analyzers, dead space has been of such value that the response time is not as small as sometimes required.

It is thus an object of this invention to provide a gas analyzer including a sampling head which may be rapidly cleared during use without being dismantled, and once cleared, be ready immediately for continued use.

It is another object of this invention to provide such a sampling head which is easily adjusted and maintains its adjustment during use and clearing operations.

It is another object of this invention to provide such a sampling head in which no O-ring or other seals subject to misalignment are used.

It is another object of this invention to provide such a sampling head in which substantially precise alignment between all parts are maintained at all times.

It is another object of this invention to provide such a gas analyzer in which dead space is relatively small and the response time is relatively fast.

It is another object of this invention to provide such a gas analyzer in which the response time is substantially constant and independent of adjustment of the sampling head.

Another object of this invention is to provide such a gas analyzer in which flow through the sampling head is substantially laminar, thus further insuring a fast response time.

In human respiratory washout tests it is sometimes necessary to use the sampling head for remote sampling, such as with the 7-minute washout test. At other times it is necessary to use the sampling head for direct sampling with a mouthpiece, or to place the sampling head directly into a hose or tubing for in-line sampling. Prior sampling heads have not been satisfactory for all three types of uses, and it is thus another object of this invention to provide such a gas analyzer including a sampling head which is readily adaptable for use in direct sampling with mouthpieces, in in-line sampling in tubing, or in remote sampling.

Large electrical voltages are employed with gas analyzers such as described, and in prior gas analyzers large insulators are used to prevent voltage arcing and electrical shock to the operator or patient. Use of large insulators for this purpose necessarily increases the dead space and the response time in the instrument. Thus, it is another object of this invention to provide a gas analyzer in which the danger of electrical shock to the operator or patient is small, and in which the response time is relatively faster than prior such devices.

These and other objects of this invention are accomplished by a gas analyzer including a sensing head and a sampling head in which all the major components are coaxially aligned with respect to each other during use and clearing. The sampling head includes a needle-like outer elongated tubular member that has an aperture for admission of gas and an inner elongated tubular member coaxially mounted in the outer tubular member and extending from adjacent the aperture through the outer tubular member. The outer tubular member is mounted in the inner tubular member with a close sliding fit, and a flow restriction means extends coaxially in the tubular members to restrict the flow of gas to predetermined amounts. One of the tubular members moves in the other tubular member from a first position in which the flow of gas through the sampling head is relatively restricted by the flow restriction means for providing small sampled amounts of gas to the sensing head, to a second position in which the flow of gas through the sampling head is relatively unrestricted by the flow restriction means to permit clearing of the flow passage through the sampling head. It is preferred that a resilient biasing means be connected between the inner and outer tubular members so that the tubular member that moves automatically returns from the second position to the first position after each clearing operation.

Because of the coaxial relationship of the inner and outer tubular members and the flow restriction means, and by mounting the inner tubular member and the flow restriction means close to the aperture in the outer member, dead space is kept to a minimum and is relatively insignificant in comparison to the dead space in the lung or the electronics employed.

Also, it is preferred that the outer tubular member be a needle and that the aperture therein be small so that it may be used for in-line sampling.

In order to prevent electrical shock to the operator or patient, while using a relatively small insulator in the flow path of the sampled gas, the entire assembly is encased in metal and grounded; and the high voltage applied to the sensing means is maintained relatively close to ground.

In the drawings, wherein is illustrated a preferred embodiment of this invention, and wherein like numerals are used throughout to designate like parts;

FIG. 1 is an overall schematic of a nitrogen gas analyzer utilizing this invention, and includes a partial section through the sensing head;

FIG. 2 is a sectional view of the sampling head of this invention;

FIG. 3 is an exploded view taken at 3 in FIG. 2;

FIG. 4 is a sectional view taken at 4—4' of FIG. 2.

FIG. 5 is a circuit diagram for another embodiment of the invention.

Referring to FIG. 1 a preferred form of nitrogen gas analyzer for medical application utilizing the principles of this invention is illustrated. This analyzer includes a sensing head 10 having a housing 10a with a gas inlet 11 to which a sampling head 12 is connected, and a gas outlet 13 to which a vacuum pump 14 is connected by a suitable hose 15. For use in respiratory nitrogen washout tests vacuum pump 14 should maintain a vacuum of about 1 mm. of mercury at a vacuum pump rate of about 25 liters per minute.

Housing 10a is preferably formed of a solid opaque material, such as bakelite or plastic, and has two spaced-apart sections 16 and 17. Section 16 has a suitable opening 16a therethrough for inlet 11 and section 17 has a suitable opening 17a therethrough for outlet 13. Sections 16 and 17 are spaced apart to form an open space 18 which is bridged by an ionization chamber 19 preferably formed by a cylindrical translucent member 19a connected at one end in a sealed relationship to inlet 11 and at its opposite end in a sealed relationship to outlet 13. On the opposite sides of member 19a are spaced-apart electrodes 20 and 21. Electrode 20 is preferably made of brass and is a ring-shaped member forming the end of chamber 19 in section 16. Inlet 11, which is also preferably made of brass is a cylindrical shaped member having a passageway 11a therethrough and is inserted into the outside end of opening 16a. Cylinder 19a and electrode 20 are mounted into the inside end of opening 16a and spaced from inlet 11. The space between these members in opening 16a is preferably filled, except for a passageway in the center, with a suitable insulator 22 of insulating material such as General Electric RTV-560 which has low outgassing properties and good sealing and insulating properties. The passageway formed in the center of opening 16a by insulator 22 is in line with passageway 11a in inlet 11 and the opening in ring electrode 20, and provides a passageway for conduction of gas from inlet 11 to chamber 19.

Electrode 21 is preferably made of tantalum and is an open ring about the end of cylinder 19a in the inside end of opening 17a. An insulating cylindrical sleeve 23 preferably made of PVC shrink tubing is inserted into and against the wall of opening 17a in section 17. Outlet 13 is preferably made of brass and is also inserted into opening 17a and extends from about electrode 21 through the outside end of opening 17a. Outlet 13 includes an external portion 13a which is grooved to permit an air tight connection to hose 15, and a center passageway 13b which, as illustrated in FIG. 1, has a larger diameter near electrode 21 and a smaller diameter through portion 13a. This arrangement of passageway 13b provides a muffler which reduces air surges and permits filtering of the airflow.

Mounted on housing 10a and spaced from cylinder 19a is an optical filter 24 which, for detecting the presence of nitrogen gas, is peaked at approximately 3,650 angstroms. As gas flows through chamber 19 and between electrodes 20 and 21, it is ionized and the rays from ionized nitrogen gas are conducted through filter 24. Filter 24 optically communicates with a chamber 25 in housing 10a, and a vacuum photoelectric tube 26, such as an RCA 934, is mounted in chamber 25. Tube 26 responds to light from filter 24 to provide an electrical signal which is the function of the nitrogen concentration of the gas ionized in chamber 19. Chamber 25 is closed by a suitable electrical receptacle 27 which has separate terminals connected by electrical wires to the base of tube 26. The anode of tube 26 is connected through receptacle 27 to a suitable anode supply 28 and the electrical signal from tube 26 indicating nitrogen concentration is conducted through receptacle 27 to a read-out circuit. This circuit is illustrated as including an amplifier 29, a linearization circuit 30 connected to the output of amplifier 29, and meter circuit 31 including meter amplifier 31a connected to the output of circuit 30, and a meter 31b. Meter 31b is calibrated to read out directly the percentage of the nitrogen concentration of sampled amounts of gas from human expiration.

The details of a suitable read-out circuit are well known to those skilled in the art and can be found in the article "A Stable Linear Nitrogen Analyzer for Physiologic Research," by Blumenthal and Cander, *Journal of Applied Physiology*, Vol. 21, pp. 1,099–1,102, 1966.

Electrodes 20 and 21 are connected through electrical wires to a source of electrical current 32. Source 32 is preferably a constant current source, having an output terminal 32a connected to electrode 20 and an output terminal 32b connected to electrode 21. The voltage at terminal 32a is relatively high compared to the voltage at terminal 32b and is substantially near ground potential. The voltage on electrode 20 is thus near ground so that if inlet 11 is grounded to prevent shock to the patient, the voltage across insulator 22 is relatively small and is not likely to jump across the insulator. Also, this arrangement permits insulator 22 to be relatively small so that the flow of gas through insulator 22 does not greatly increase the response time of the analyzer. In the embodiment illustrated the electrical potential at electrode 20 is about 50 volts negative and the electrical potential at electrode 21 is in the range of 750 to 1,200 volts negative. The current between electrodes 20 and 21 is maintained by source 32 at a constant value of about 1 ma and it is preferred that the electrical current flow be in the opposite direction to the air flow through chamber 19. In this way if any oxides form on electrode 21 they will be carried out by the air stream and will not enter chamber 19.

Housing 10a may be encased in a stainless steel case 33 in which case a ground wire is connected to the case such as at 34. Case 33 is also in electrical contact with inlet 11.

Inlet 11 includes threads on a portion 11a extending from opening 16, and sampling head 12 may be easily connected to and from inlet 11 by insertion into these threads. As shown in FIG. 2 and FIG. 4 sampling head 12 includes a first elongated tubular member 35 having an open end 36 and an aperture 37 spaced from open end 36. Member 35 is preferably cylindrical and has a straight, smooth, center bore between aperture 37 and open end 36. The end of member 35 opposite end 36 is closed and may be pointed as at 35a so that member 35 forms a needle. As illustrated in FIG. 2, tubular member 35 is mounted with a close fit in a cylindrical sleeve 38 which includes an upper threaded portion 38a. Member 35 is soldered or otherwise fixed to sleeve 38 at point 39 intermediate aperture 37 and open end 36. Sleeve 38 also includes a lower circular lip 38b extending laterally about the lower end of sleeve 38 in FIG. 2. Soldered to and extending from opposite sides of lip 38a are L-shaped flanges 38c and 38d which permit easy gripping of the assembly by the operator, and provide guiding of the assembly as hereinafter described.

A second elongated tubular member 40 is coaxially mounted inside member 35. Second tubular member 40 extends at one end from adjacent aperture 37, and between aperture 37 and end 36, through end 36. The end of member 40 extending from member 35 includes an enlarged cylindrical portion 41 having a laterally extending lip 42 which is adapted to fit into the threads of inlet 11 so that portion 41 may be connected to inlet 11. Also, hosing may be fitted over portion 41 in an airtight relationship when sampling head 12 is used for remote sampling. Tubular member 40 is also a long, straight, smooth walled cylinder having a long, straight, center bore which forms a passageway 43 for conduction of gas to be sampled from aperture 37 to the exterior of member 40. As illustrated in the preferred embodiment shown in FIG. 2 the entire outer wall of tubular member 35 has a close sliding fit with the corresponding inner wall of tubular member 35, and tubular member 40 is movable inside tubular member 35. The close fit along a substantial part of the lengths of the inner wall of member 35 and the outer wall of member 40 forms an adequate seal for preventing leakage of gas from the interior of the members.

A cylinder 44 is mounted through an opening in its bottom 44a on lower portion 42 of tubular member 40 and forms a housing in which sleeve 38, L-shaped flanges 38c and 38d, and tubular member 35 are mounted. Cylinder 44 is open at its top and includes longitudinal slots on opposite sides of its side wall, the width of each slot being slightly larger than the width of the lower bars of L-shaped members 38c and 38d. Each of L-shaped flanges 38c and 38d fit into one of the slots formed in cylinder 44 when first tubular member 35 is inserted over second tubular member 40. Bottom 44a of cylinder 44 forms a seat for flanges 38c and 38d, as shown in FIG. 2. The whole assembly formed by tubular member 35, sleeve 38 and L-shaped flanges 38c and 38d is thus movable longitudinally with respect to the assembly formed by tubular member 40 and cylinder 44, with flanges 38c and 38d being guided in the slots of cylinder 44. The movement is from a first position as shown in FIG. 2 where flanges 38c and 38d are seated on bottom 44a, to a second position where they are spaced from bottom 44a, but still guided by the slots of cylinder 44.

A flow restriction means is coaxially mounted in tubular members 35 and 40 and restricts the flow from aperture 37 to passageway 43 to a predetermined amount. In the preferred embodiment illustrated, this flow restriction means is a needle 45 which extends from adjacent aperture 37 and on the side thereof opposite to the end of tubular member 40 in member 35, into passageway 43 where it terminates. Needle 45 is illustrated as a projection from a plug 46 which seals the pointed end 35a of tubular member 35 and is thus fixed to tubular member 35. Thus, when tubular members 35 and 40 are moved relative to each other the penetration of needle 45 in passageway is changed to vary the flow rate through sampling head 12.

In the embodiment illustrated needle 45 is cylindrical and has a diameter of about 0.041 inches, and forms an elongated annulus 45a with the inner wall of tubular member 40. The clearance on a radius of annulus 45a between needle 45 and the inner wall of tubular member 35 is only about 0.0003 inches. Aperture 37 is at atmospheric pressure, and when sampling head 42 is connected to sensing head 10 passageway 43 is at the pressure of chamber 19, for example 1 mm. of mercury.

When needle 45 is in the position in passageway 43 shown in FIG. 2 and FIG. 3, that is with flanges 38c and 38d in the first position described, then the greatest restriction to flow between aperture 37 and passageway 43 is provided. When mucus or other obstructions collect in annulus 45a this can be cleared by moving needle 45 to reduce the length of annulus 45a and increase the rate of flow therethrough. However, once annulus 45a is cleared it is necessary that needle 45 be returned to the exact position it had in passageway 43 prior to clearing, i.e., that the geometry of annulus 45a remain fixed during actual test use. A resilient biasing means is preferably connected for urging needle 45 from the clearing position to the operating position each time the sampling head is cleared. As shown in FIG. 2 this resilient biasing means is preferably a coil spring 47 disposed between L-shaped flanges 38c and 38d, connected to first tubular member 35, and cylinder 44 connected to second tubular member 40. Spring 47 is placed inside of cylinder 44 and about sleeve 38, and placed under compression in cylinder 44 by a cylindrical cap 48 which abuts spring 47 and closes the top end of cylinder 44 as shown in FIG. 2. Cap 48 fits about sleeve 38 and rests on shoulders 44b and 44c in cylinder 44, and is held in place by a circular clip 49 which is forced into a suitable groove 50 in cylinder 49. Spring 47 is placed under sufficient compression so that it is necessary to exert a force to move flanges 38c and 38d off bottom 44a. Thus, when the assembly including flanges 38c and 38d is moved off bottom 44a, spring 47 is further compressed and flanges 38c and 38d are urged back to their seated position on bottom 44a.

As previously noted, portion 38a of sleeve 38 is threaded. If desired, a nut 51 may be screwed onto threaded portion 38a until it abuts against cap 48. Adjustment of the position of nut 51 on the threads of threaded portion 38a changes the length of annulus 45a to change the flow rate through sampling head 12.

Since outer tubular member 35 is needle-like and aperture 37 is small, the sampling head of this invention is adapted for inline sampling by insertion of member 35 into a tubing or hose (not shown). Also, it can conveniently be used with a mouthpiece 52 as illustrated in FIG. 1, the mouthpiece being mounted on housing 10a by screws, and the needle-like outer tubular member 35 being inserted through a rubber grommet 53 into the mouthpiece. If remote sampling is desired, sampling head 12 can be readily disconnected from sensing head 10 and a hose of desired length connected between connector 42 and inlet 11 and only an adapter for connecting the hose to inlet 11 need be provided.

Because tubular members 35 and 40 are elongated and are coaxial with long, straight, close-fitting walls, and because annulus 45a is elongated, precise alignment is maintained in sampling head 12 between its parts as it is moved between the clearing and operating positions, or adjusted by nut 51. Also, by this arrangement, annulus 45a and passageway 43 are placed very close to aperture 37 and dead space is kept to a minimum. Thus, in the area where the gas flow rate is slow, dead space in minimal. Also, because of the use of elongated tubular members to provide annulus 45a, and the long, straight flow passage in tubular member 40 where the flow rate is faster, substantially laminar flow is provided which further increases response time. The elongated coaxial relationship of members 35 and 40 also provides adequate sealing without the use of O-rings or other seals subject to misalignment. The coaxial relationship of members 35 and 40 and flow restriction means 45 remains fixed at all times so that the clearance of annulus 45a is constant. After each clearing of annulus 45a, spring 47 returns flow restriction means 45 to the same position it had prior to clearing so that the geometry of annulus 45a is fixed for each adjustment of the sampling head.

The response time of sampling head 12 is extremely fast, being only about 3 ms., and is very small compared to the overall system which has a response time of about 30 ms. This compares favorably with prior gas analyzer systems which have a response time in the range of 50 to 100 ms.

As illustrated in FIG. 1, electrodes 20 and 21 are connected to constant current supply 32 through resisters $R_1$ and $R_2$, and the current between electrodes 20 and 21 is maintained at a constant value while the voltage between them varies.

Referring to FIG. 5, another form of this invention is shown which permits electrode 20 to be directly grounded so that inlet 11 may be connected directly to electrode 20 and at the same time provides for a constant current flow between electrodes 20 and 21. With electrode 20 at ground potential, insulator 22 need not be provided and the flow path from inlet 11 to chamber 19 can be further reduced. This can be accomplished by connecting a neon lamp 54 in series with terminal 32b of constant current supply 32 and mounting neon lamp 54 and in optional communication with a photoelectric cell 55. Lamp 54 and cell 55 are enclosed in a lighttight housing 56, so that when the current between electrodes 20 and 21 tends to change, the illumination of neon lamp 54 will change. This change in illumination is detected by photo cell 55 which is connected to constant current supply 32. The electrical output signal of photo cell 55 can be used as a control signal for automatically adjusting source 32 to provide the desired constant current.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in sampling and analyzing a gas, comprising, in combination; a housing; sensing means in said housing and responding to sampled amounts of said gas to provide a detectable indication that is a function of the concentration of at least part of said sampled amount of gas; and a sampling head connected to said housing and adapted to be disposed between said housing and a source of gas to be analyzed to provide said sampled amounts of gas to said sensing means, said sampling head including a first elongated tubular member having an open end and an aperture spaced from said open end, said aperture providing a passage through which gas to be analyzed may be conducted to the interior of said member, a second elongated tubular member coaxially mounted with a close fit in said first member and extending from adjacent said aperture through said open end to provide a passageway for conduction of said gas from the interior of said first tubular member toward said sensing means; and flow restriction means coaxial with said first member and extending from adjacent said aperture into and coaxial with said second tubular member to restrict flow of said gas from said aperture into said second tubular member to a predetermined amount.

2. The apparatus of claim 1 wherein said flow restriction means and said second member are movable relative to each other between a first position in which said flow restriction means provides relatively restricted flow of said gas between said aperture and said second member, and a second position in which said flow is relatively free to permit clearing of said passageway of obstructions to flow therethrough.

3. The apparatus of claim 2 wherein said second member is slidably movable in said first member between said first and second positions.

4. The apparatus of claim 2 further including resilient biasing means connected between said flow restriction means and said second member for forcefully urging said flow restriction means and said second member into said first position.

5. The apparatus of claim 1 wherein the end of said first member opposite said open end is closed and said aperture is in a side wall of said first member and adjacent said closed end, and said second member extends in said first member away from said closed end and from closely adjacent said aperture and between said aperture and said open end, and said flow restriction means extends from between said closed end and said aperture into said second member at the end thereof adjacent said aperture, said flow restriction means terminating in said second member and forming an elongated annulus of a relatively small clearance with the inner wall of said second member, said annulus providing a passageway for the flow of said gas from said aperture into said second member.

6. The apparatus of claim 5 wherein each of said first and second members are straight cylindrical tubes of uniform diameter and have smooth wall surfaces.

7. The apparatus of claim 5 wherein said flow restriction means and said second member are movable relative to each between a first position in which said flow restriction means provides relatively restricted flow of said gas between said aperture and said second member, and a second position in which said flow is relatively free to permit clearing of said annulus from obstructions to flow therethrough.

8. The apparatus of claim 7 wherein said second member is slidably movable in said first member between said first and second positions.

9. The apparatus of claim 7 further including resilient biasing means connected between said flow restriction means and said second member for forcefully urging said flow restriction means and said second member into said first position.

10. As a sub-combination, a sampling head for regulating the flow of sampled amounts of gas into an apparatus for sampling and analyzing such a gas, comprising: a first elongated tubular member having an open end and an aperture spaced from said open end, said aperture providing a passage through which gas to be analyzed may be conducted to the interior of said member; a second elongated tubular member coaxially mounted with a close fit in said first tubular member and extending from adjacent said aperture through said open end to provide a passageway for conduction of said gas from the interior of said first tubular member to the exterior thereof; and flow restriction means coaxial with said first tubular member and extending from adjacent said aperture into and coaxial with said second tubular member to restrict flow of said gas from said aperture into said second tubular member to a predetermined amount.

11. The sampling head of claim 10 wherein said flow restriction means and said second member are movable relative to each other from a first position in which said flow restriction means provides relatively restricted flow of said gas between said aperture and said second member, and a second position in which said flow is relatively free to permit clearing of said passageway of obstructions to flow therethrough.

12. The sampling head of claim 11 wherein said second member is slidably movable in said first member between said first and second positions.

13. The sampling head of claim 11 further including resilient biasing means connected between said flow restriction means and said second member for forcefully urging said flow restriction means and second member into said first position.

14. The sampling head of claim 13 wherein said flow restriction means is rigidly connected to said first member and said biasing means is connected between said first and second members.

15. The sampling head of claim 10 wherein the end of said first member opposite said open end is closed and said aperture is in a side wall of said first member and adjacent said closed end, and said second member extends in said first member away from said closed end and from closely adjacent said aperture and between said aperture and said open end, and said flow restriction means extends from between said closed end and said aperture into said second member at the end thereof adjacent said aperture, said flow restriction means terminating in said second member and forming an elongated annulus of a relatively small clearance with the inner wall of said second member, said annulus providing a passageway for the flow of said gas from said aperture into said second member.

16. The sampling head of claim 15 wherein each of said first and second members are straight cylindrical tubes of uniform diameter having smooth wall surfaces.

17. THe sampling head of claim 15 wherein said flow restriction means and said second member are movable relative to each other between a first position in which said flow restriction means provides relatively restricted flow of said gas between said aperture and said second member, and a second position in which said flow is relatively free to permit clearing of said annulus from obstruction to flow therethrough.

18. The sampling head of claim 17 wherein said second member is slidably movable in said first member between said first and second positions.

19. The sampling head of claim 17 further including resilient biasing means connected between said flow restriction means and said second member for forcefully urging said flow restriction means and said second member into said first position.

20. The sampling head of claim 19 wherein said flow restriction means is rigidly connected to said first member and said biasing means is connected between said first and second members.

21. Apparatus for use in sampling and analyzing a gas comprising in combination: a source of electrical potential including a high voltage terminal providing a relatively high electrical voltage substantially near ground potential, and a low voltage terminal providing an electrical voltage that is low with respect to said high voltage; a housing; means pervious to light mounted in said housing and forming an ionization chamber; two spaced-apart electrodes, each on opposite sides of said chamber, one of said electrodes being connected to said high voltage terminal and the other of the electrodes being connected to said low voltage terminal; an effectively grounded gas inlet in said housing adjacent said one electrode and in communication with the interior of said chamber to permit gas to pass from said inlet past said one electrode and into said chamber; and a sampling head connected to said inlet for regulating the flow of gas into said chamber, said sampling head including a first elongated tubular member having an open end and an aperture spaced from said open end, said aperture providing a passage through which gas to be analyzed may be conducted to the interior of said member, a second elongated tubular member coaxially mounted with a close fit in said first tubular member and extending from adjacent said aperture through said open end to provide a passageway for conduction of said gas from the interior of said first tubular member to said inlet, and flow restriction means coaxial with said first member and extending from adjacent said aperture into and coaxial with said second tubular member to restrict flow of said gas from said aperture into said second tubular member to a predetermined amount.

22. The apparatus of claim 21 wherein said one electrode is grounded and further including means connected to said source and responding to the electrical current between said electrodes to maintain said current at a substantially constant value.

\* \* \* \* \*